(12) United States Patent
Endo et al.

(10) Patent No.: US 8,844,890 B2
(45) Date of Patent: Sep. 30, 2014

(54) PASSENGER'S WEIGHT MEASUREMENT DEVICE FOR VEHICLE SEAT

(75) Inventors: Shigeru Endo, Shioya-gun (JP); Kenji Sato, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 811 days.

(21) Appl. No.: 12/971,690

(22) Filed: Dec. 17, 2010

(65) Prior Publication Data

US 2011/0084525 A1 Apr. 14, 2011

Related U.S. Application Data

(63) Continuation of application No. 11/632,351, filed as application No. PCT/JP2005/013943 on Jul. 29, 2005, now Pat. No. 7,878,570.

(30) Foreign Application Priority Data

Jul. 30, 2004 (JP) ................................. 2004-223421

(51) Int. Cl.
| | |
|---|---|
| F16M 13/00 | (2006.01) |
| B60N 2/42 | (2006.01) |
| G01G 19/414 | (2006.01) |
| B60N 2/00 | (2006.01) |
| B60N 2/07 | (2006.01) |
| B60R 21/015 | (2006.01) |

(52) U.S. Cl.
CPC ....... *B60N 2/002* (2013.01); *B60R 2021/01516* (2013.01); *B60N 2/4263* (2013.01); *B60R 21/015* (2013.01); *G01G 19/4142* (2013.01); *B60N 2/0732* (2013.01)
USPC ............................ 248/429; 248/424; 180/273

(58) Field of Classification Search
USPC ......... 248/424, 429, 430; 180/273; 297/216.2
See application file for complete search history.

(56) References Cited

U.S. PATENT DOCUMENTS 3,792,896 A * 2/1974 Eggert, Jr. ................. 297/216.2
5,600,104 A 2/1997 McCauley et al.
(Continued)

FOREIGN PATENT DOCUMENTS

DE 103 15 400 A1 10/2004
GB 2 415 787 A 1/2006
(Continued)

OTHER PUBLICATIONS

Office Action for U.S. Appl. No. 11/632,351 dated Sep. 30, 2009.
(Continued)

*Primary Examiner* — Gwendolyn W Baxter
(74) *Attorney, Agent, or Firm* — Oliff PLC

(57) ABSTRACT

To provide a passenger's weight measurement device for a vehicle seat which can be assembled to prevent the occurrence of the initial deformation and the initial load. The passenger's weight measurement device comprises a pair of left and right fixed lower rails, a pair of movable upper rails disposed to be movable in a front-and-rear direction on each of the fixed lower rails, load sensors fixed on an upper surface of the left movable upper rail, load sensors mounted on the movable upper rail to be movable in a left-and-right direction with respect to the right movable upper rail, and a rectangular frame mounted on the load sensors. Mounting holes are formed on the rectangular frame, and rods are inserted into the mounting holes from bottom up. The rods are engaged with nuts.

36 Claims, 7 Drawing Sheets

(56) References Cited

U.S. PATENT DOCUMENTS

| | | |
|---|---|---|
| 5,991,676 A | 11/1999 | Podoloff et al. |
| 6,356,200 B1 | 3/2002 | Hamada et al. |
| 6,555,765 B2 | 4/2003 | Paine |
| 6,677,539 B2 | 1/2004 | Miura et al. |
| 6,682,146 B2 | 1/2004 | Minai |
| 6,774,625 B2 | 8/2004 | Suzuki et al. |
| 6,810,984 B2 | 11/2004 | Sakai et al. |
| 7,137,665 B2 | 11/2006 | Osawa et al. |
| 7,189,931 B2 | 3/2007 | Hida et al. |
| 7,322,605 B2 | 1/2008 | Ventura et al. |
| 7,373,846 B2 | 5/2008 | Furukawa et al. |
| 7,455,343 B2 | 11/2008 | Endo et al. |
| 7,614,680 B2 | 11/2009 | Endo et al. |
| 7,793,557 B2 | 9/2010 | Endo et al. |
| 8,028,786 B2 * | 10/2011 | Takayasu et al. .......... 180/273 |
| 8,051,941 B2 * | 11/2011 | Takayasu et al. .......... 180/273 |
| 8,091,675 B2 * | 1/2012 | Endo et al. ................ 180/273 |
| 8,136,620 B2 | 3/2012 | Hwang et al. |
| 8,316,982 B2 * | 11/2012 | Endo et al. ................ 180/273 |
| 2005/0061643 A1 | 3/2005 | Rainey |

FOREIGN PATENT DOCUMENTS

| | | |
|---|---|---|
| JP | A-08-164039 | 6/1996 |
| JP | A-09-207638 | 8/1997 |
| JP | 10-297334 A | 11/1998 |
| JP | 11-304579 A | 11/1999 |
| JP | 2000-203324 A | 7/2000 |
| JP | A-2003-011709 | 1/2003 |
| JP | 2003-96855 | 4/2003 |
| JP | A-2004-268620 | 9/2004 |
| JP | A-2004-306849 | 11/2004 |

OTHER PUBLICATIONS

Office Action for U.S. Appl. No. 11/632,351 dated Jun. 8, 2010.
May 24, 2012 Second Office Action issued in Chinese Application No. 201010552150.5 with English-language translation.
Aug. 2, 2012 Office Action issued in U.S. Appl. No. 13/137,713.
Nov. 29, 2011 Office Action issued in Japanese Application No. 2007-537702 (with English translation).
Nov. 30, 2011 Office Action issued in Chinese Application No. 201010552150.5 (with English translation).
Jan. 12, 2012 Office Action issued in European Application No. 10007613.2.
Dec. 15, 2011 Search Report issued in European Application No. 11181454.7.
Office Action from European Patent Application No. 10 007 613.2 dated Jun. 14, 2011.
Apr. 9, 2012 Office Action issued in U.S. Appl. No. 13/105,483.

* cited by examiner

PASSENGER'S WEIGHT MEASUREMENT DEVICE FOR VEHICLE SEAT

This application is a Continuation application of application Ser. No. 11/632,351 filed Jan. 12, 2007, now U.S. Pat. No. 7,878,570 which is a National Phase application of PCT/JP2005/013943 filed Jul. 29, 2005, which claims priority to Japanese Application No. 2004-223421 filed Jul. 30, 2004. The disclosures of each of these applications is hereby incorporated by reference in their entirety.

TECHNICAL FIELD

The present invention relates to a passenger's weight measurement device for a vehicle seat which measures a weight of a passenger who sits on a vehicle seat.

BACKGROUND

Recently, to improve performance of various safety devices such as a seat belt and an air bag, operations of the safety devices have been controlled in accordance with a weight of a passenger sitting on a vehicle seat in some cases. In the conventional passenger's weight measurement device for measuring a weight of a seated passenger, a load sensor is disposed between a vehicle floor and the vehicle seat (For example, refer to Patent Document 1 and Patent Document 2). Patent Document 1: Japanese Patent Document 10-297334 Patent Document 2: Japanese Patent Document 11-304579

Generally, in a vehicle seat, it is often the case that a slide rail is disposed between a cushion frame and a floor, and a vehicle seat is to move in a front-and-rear (i.e., longitudinal) direction by the slide rail. Therefore, because a load transmitted to a load sensor varies according to the position of the vehicle in a longitudinal direction, the load variability according to a longitudinal position of the vehicle needs to be considered in order to improve the accuracy of the passenger's weight measurement. Although it is not a publicly know invention, the load sensor is disposed between the slide rail and the cushion frame, and the applicant of the present application filed a patent application related to such an invention (JP Application No. 2003-096855). According to such an invention, the load which is transmitted to the load sensor can be always held constant regardless of longitudinal position of the vehicle seat by moving the load sensor in a longitudinal direction in unity with the vehicle seat and the slide rail.

However, in case that the positional relation between the cushion frame and the load sensor, the positional relation between the load sensor and the slide rail, and the configuration of the cushion frame and the like are not accurate as they are designed, an initial deformation and an initial load may occur when assembling the load sensor, the cushion, and the slide rail to each other. Thus, there is a potential risk that the passenger's weight cannot be measured accurately.

An object of the present invention is to provide a passenger's weight measurement device for a vehicle seat which can be assembled to suppress the initial deformation and the initial load.

SUMMARY

To solve the aforementioned problem, a passenger's weight measurement device for a vehicle seat comprises a pair of left and right movable rails which are disposed to be movable in a longitudinal direction on each of a pair of left and right fixed rails fixed on a vehicle side, a plurality of load sensors which are mounted on the pair of movable rails and which comprises rods extending above, a rectangular frame which is disposed on an upper side of the pair of movable rails and in which a plurality of mounting holes corresponding to the plurality of load sensors are formed to penetrate in an up and down (i.e., vertical) direction, and the rectangular frame in which the rods of the plurality of load sensors are inserted into the plurality of mounting holes from bottom up, is mounted on the plurality of load sensors.

As described above, because the rods of the load sensors are inserted from bottom up into the mounting holes which are formed on the pre-assembled rectangular frame and the rectangular frame is mounted on the load sensors, the initial deformation and the initial load can be suppressed more as compared with the case where the parts of the rectangular frame are mounted on the load sensor and then the rectangular frame are framed by assembling the parts.

In the present invention, it is preferred that nuts are engaged with the plurality of rods and the rods are fixed to the rectangular frame by tightening of the nuts.

In the present invention, it is preferred that one load sensor of the plurality of load sensors is mounted on one movable rail of the pair of movable rails in a state that the one load sensor is fixed to the one movable rail, and another load sensor of the plurality of load sensors is mounted on the other movable rail of the pair of movable rails so as to move in a left-and-right (i.e., lateral) direction with respect to the other movable rail.

As described above, one of the load sensor is fixed to one of the movable rail. Another load sensor is movable in a lateral direction with respect to the other movable upper rail. Therefore, when the rectangular frame is mounted on the load sensors, rods of the load sensors can be matched to each of the mounting holes respectively by adjusting the position of another load sensor. Thus, the initial deformation and the initial load can be suppressed.

In the present invention, it is preferred that the passenger's weight measurement device for the vehicle seat further comprises a bridging member which is provided between the pair of fixed rails.

As described above, because a bridging member is provided between a pair of fixed rails, the variable of a space between a pair of fixed rails can be suppressed.

According to the present invention, the initial deformation and the initial load which occur to the rectangular frame and the fixed rail can be suppressed. Therefore, the accuracy of the passenger's weight measurement by the load sensor is improved.

DETAILED DESCRIPTION

Figure 1:
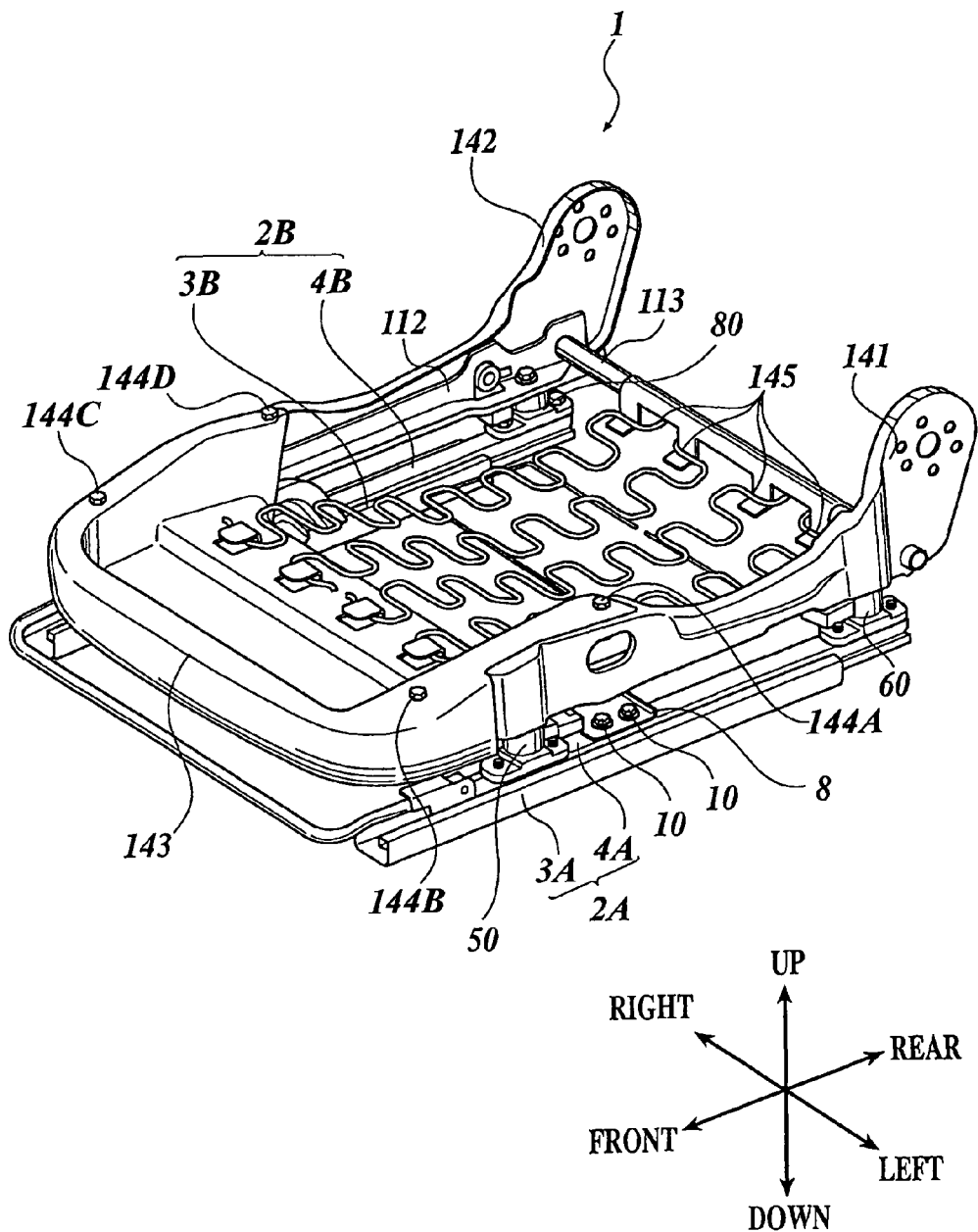
FIG. 1 This is a perspective view showing a passenger's weight measurement device 1 for a vehicle seat.

The preferred embodiments of the present invention will be described below with reference to the accompanying drawings. In the embodiments below, various technical preferable limitations are added to carry out the invention. However, the scope of the invention is not limited to the embodiments described below and the examples shown in the drawings.

Figure 2:
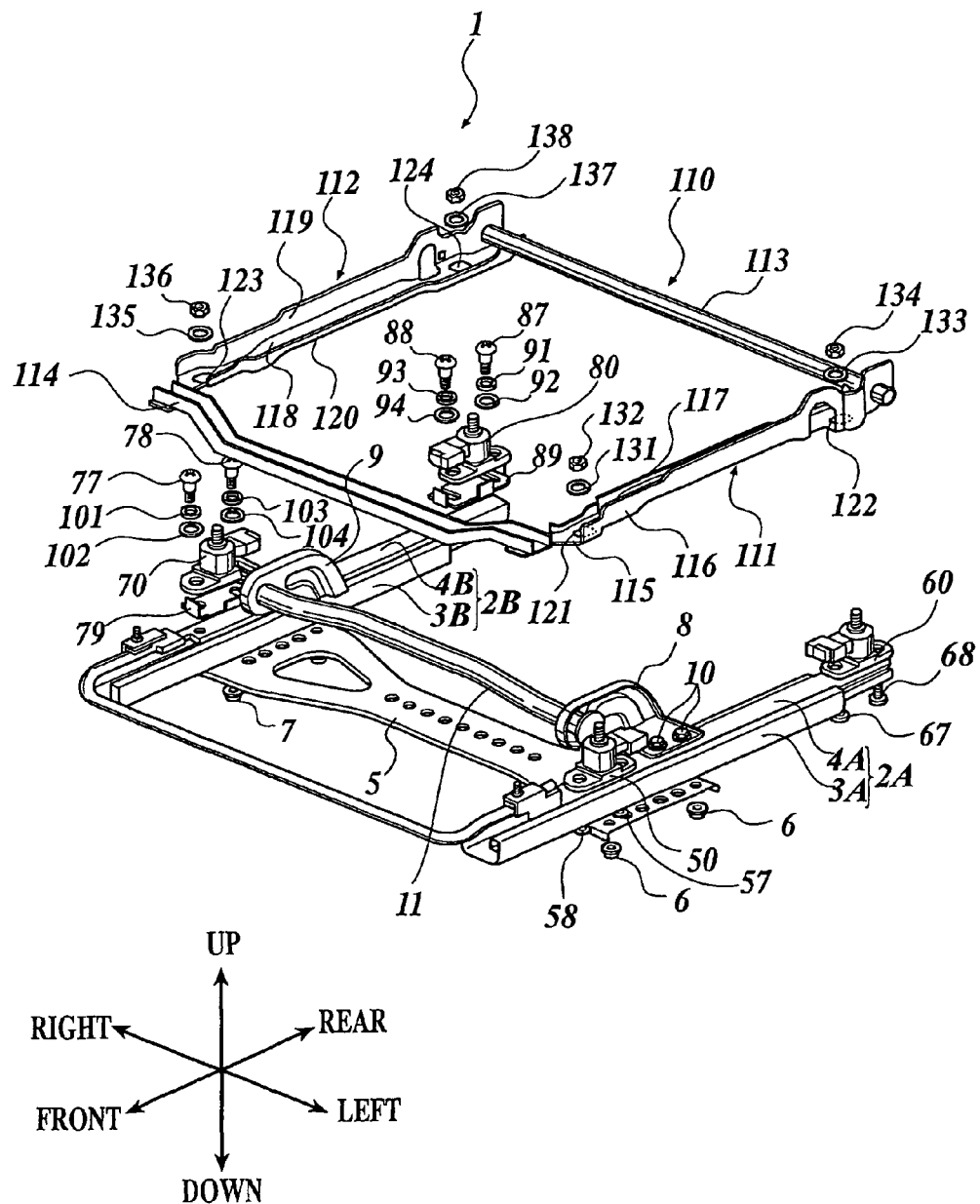
FIG. 2 This is an exploded perspective view showing a passenger's weight measurement device 1.

FIG. 1 is a perspective view showing a passenger's weight measurement device 1 for a vehicle seat, and FIG. 2 is an exploded perspective view showing a passenger's weight measurement device 1. In each of the drawings, arrows indicating vertical, lateral, and longitudinal correspond to the directions as seen from a passenger seated on the vehicle seat.

The passenger's weight measurement device 1 is mounted on the bottom of a seat cushion which a passenger sits on. Further, the passenger's weight measurement device 1 is for the right side seat of the vehicle seat. A buckle for a seatbelt is provided at the left side of the passenger's weight measurement device 1 and a tongue plate of the seatbelt is to be fastened by this buckle.

As shown in FIGS. 1 and 2, a pair of left and right seat-sliders 2A, 2B parallel to each other are disposed on the floor of the passenger compartment. Both of the seat-sliders 2A, 2B comprise a fixed lower rail 3A or 3B which extends in a longitudinal direction of the vehicle and is fixed to the floor of the passenger compartment, and a movable upper rail 4A or 4B which is engaged with the fixed lower rail 3A or 3B to be slidable in a longitudinal direction on the fixed lower rail 3A or 3B with respect to the fixed lower rail 3A or 3B.

The left end of a lower bracket 5 as a bridging member is fixed to a lower surface of the left fixed lower rail 3A by a bolt and nut connection 6, and the right end of a lower bracket 5 is fixed to a lower surface of the right fixed lower rail 3B by a bolt and nut connection 7. The lower bracket 5 is crossed over the left and the right fixed lower rails 3A, 3B and improves the rigidity to suppress the variable of the space between the left and the right fixed lower rails 3A, 3B.

The bracket 8 is fixed to the middle portion of the left movable upper rail 4A in a longitudinal direction on an upper surface thereof by a bolt and nut connection 10, and the bracket 9 is fixed to the middle portion of the right movable upper rails 4B in a longitudinal direction on an upper surface thereof by a bolt and nut connection. Both brackets 8 and 9 are formed in L-shape when seen from the front and are disposed so as to erect them on the upper surface of the movable upper rails 4A, 4B respectively.

Figure 3A:
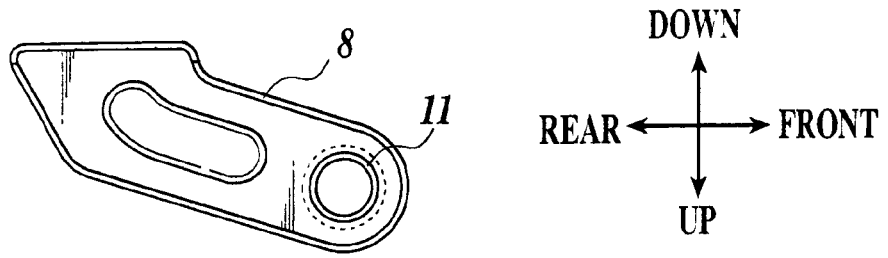
FIG. 3A This is a side view showing an attachment structure of a submarine pipe 11.
Figure 3B:
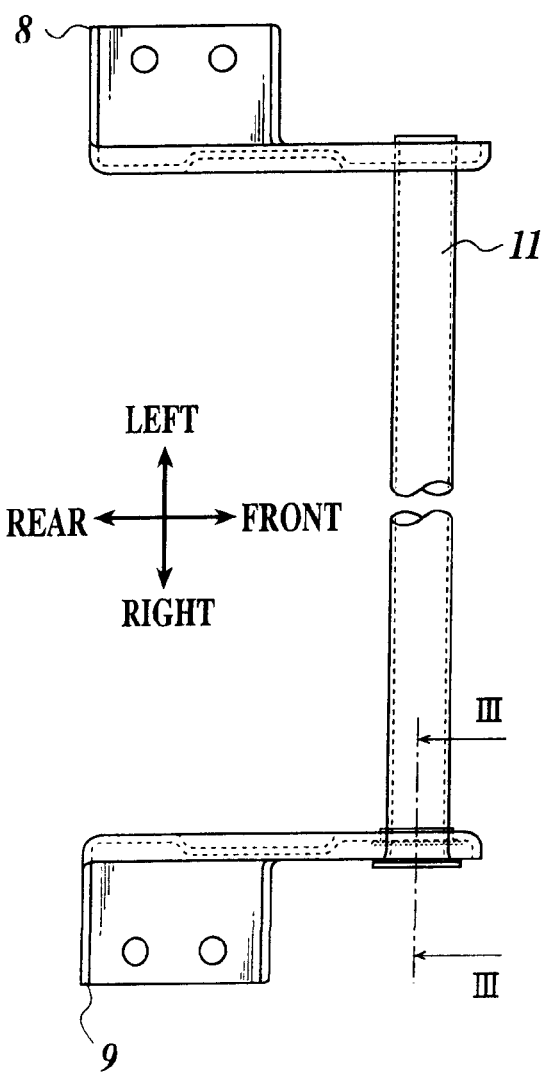
FIG. 3B This is a plan view showing an attachment structure of a submarine pipe 11.
Figure 3C:
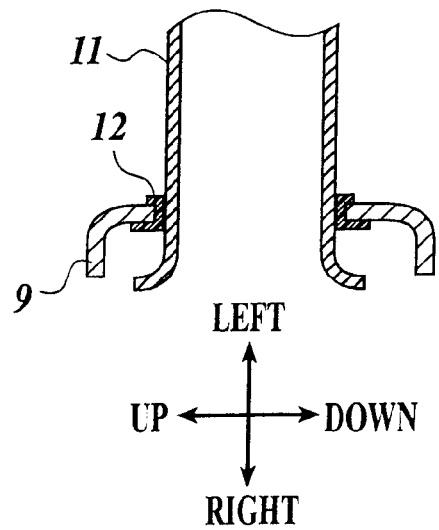
FIG. 3C This is a schematic sectional diagram cut along the line of FIG. 3B.

Between the brackets 8 and 9, a submarine pipe 11 is installed. Here, the brackets 8 and 9 and the submarine pipe 11 will be described in detail with reference to FIGS. 3A to 3C. FIG. 3A is a left side view, FIG. 3B is a top view, and FIG. 3C is a schematic sectional diagram cut along the line of FIG. 3B.

A mounting hole which penetrates in a lateral direction is formed on the left bracket 8 and the left end of the submarine pipe 11 is inserted into the mounting hole. Further, the bracket 8 and the submarine pipe 11 are fixed by welding.

A mounting hole which penetrates in a lateral direction is also formed on the right bracket 9 and the ring-shaped nylon bush 12 is fitted in the mounting hole. The bush 12 is latched by the bracket 9 along the edge of the mounting hole, and the moving of the bush 12 in the penetration direction of the mounting hole is deterred. The right end of the submarine pipe 11 is inserted into the bush 12, and the submarine pipe 11 can slide in the penetration direction of the mounting hole with respect to the bush 12. Moreover, the sectional area of the submarine pipe 11 at a predetermined distance apart towards the right end of the submarine pipe 11 from the mounting hole of the bracket 9 (here, the area at the right end) is formed to be larger than the area of the mounting hole. Particularly, the submarine pipe 11 is provided in a shape where the opening of the submarine pipe 11 becomes larger as it approaches the right end in the right side of the mounting hole of the bracket 9 (trumpet shape) to prevent the submarine pipe 11 from falling out from the bush 12 and the mounting hole. By providing a flange at the right end of the submarine pipe 11, the sectional area of the submarine pipe 11 including the flange can be made larger than the mounting hole, and the submarine pipe 11 may be prevented from falling out from the bush 12 and the mounting hole by the flange.

In the present embodiment, the submarine pipe 11 is fixed to the left bracket 8 and can slide in a lateral direction with respect to the right bracket 9. However, the submarine pipe 11 may slide in a lateral direction with respect to the left bracket 8 and may be fixed to the right bracket 9. Further, the submarine pipe 11 may slide in a lateral direction with respect to both left and right brackets 8 and 9.

As shown in FIGS. 1 and 2, a load sensor 50 is mounted on the front end of the upper surface of the left movable upper rails 4A, and a load sensor 60 is mounted on the rear end of the upper surface of the left movable upper rail 4A. The load sensors 50 and 60 detect the load as an electrical signal.

Figure 4:
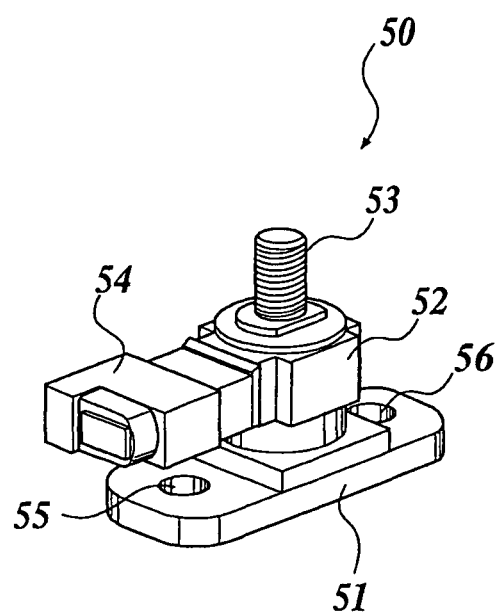
FIG. 4 This is a perspective view showing a left load sensor 50.

The left front load sensor 50 will be described with reference to FIG. 4. FIG. 4 is a perspective view showing the left front load sensor 50. As shown in FIG. 4, the left front load sensor 50 comprises a column-shaped sensing unit 52 which detects the load, a plate-like flange 51 which horizontally extends in a front direction and in a rear direction from the bottom end of the sensing unit 52, a load input rod 53 which extends upward from an upper end of the sensing unit 52, and a connector 54 which extends from the sensing unit 52 to become horizontal with the flange 51. At the front and the rear of the flange 51, male screw shaped circular holes 55 and 56 which penetrate in a vertical direction are formed respectively, and circular hole 55 is located directly beneath the connector 54. A screw thread is formed on the periphery of the load input rod 53. Moreover, the sensing unit 52 incorporates a strain gauge, and the load is converted to an electrical signal by the strain gauge.

Figure 5:
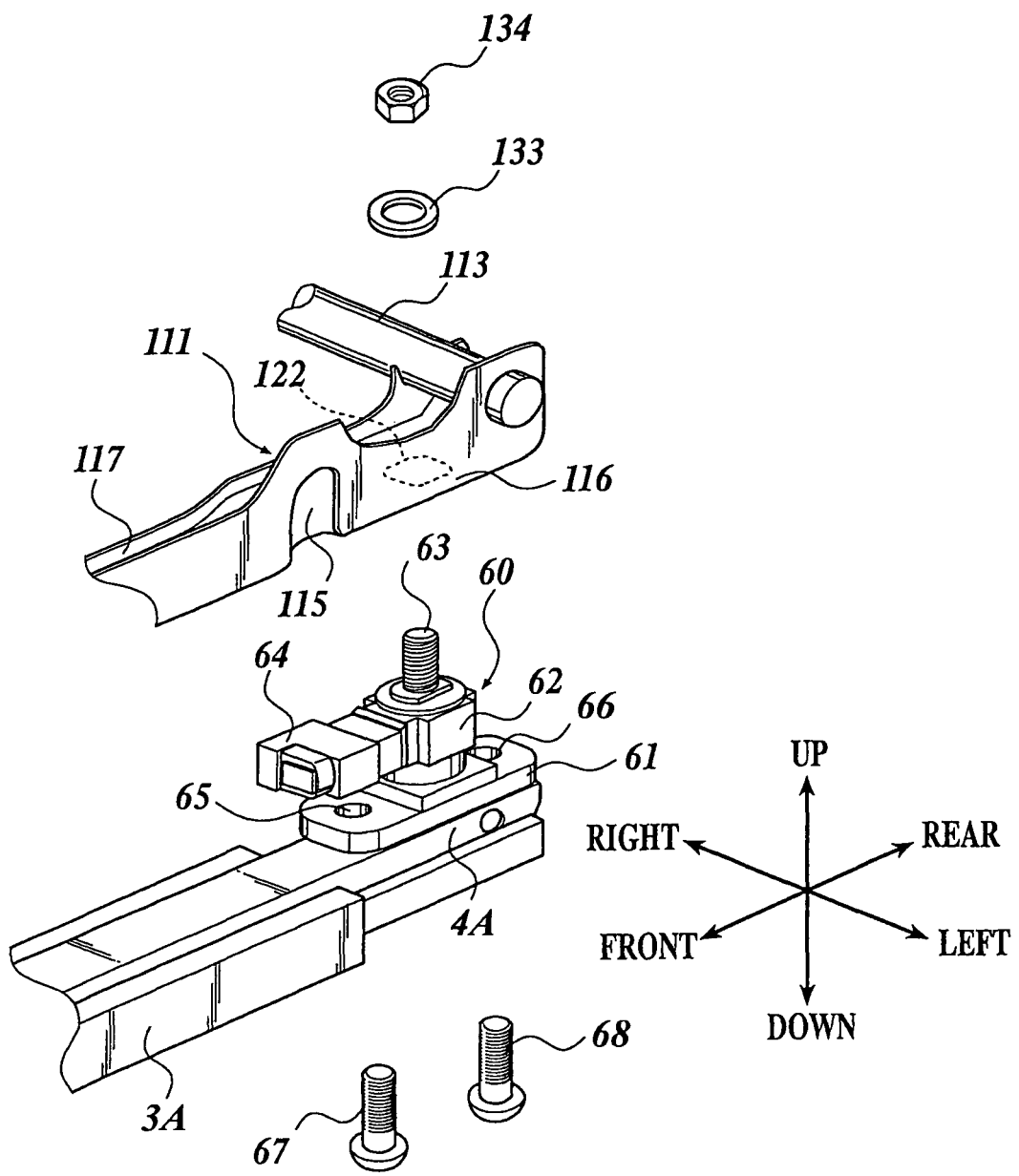
FIG. 5 This is an exploded perspective view showing an attachment structure of a load sensor 60.

FIG. 5 is an exploded perspective view showing a rear end of the left movable upper rail 4A. As shown in FIG. 5, similar to the left front load sensor 50, the left rear load sensor 60 comprises a flange 61, a sensing unit 62, a load input rod 63, and a connector 64. References having the same last single digit are assigned to the corresponding parts of the left front load sensor 50 and the left rear load sensor 60, and the description for each part of the left rear load sensor 60 is omitted.

The left rear load sensor 60 is disposed on the rear end of the left movable upper rail 4A as shown in FIG. 5. The lower surface of the flange 61 abuts the upper surface of the left movable upper rail 4A, and the male screws 67 and 68 which penetrate the movable upper rail 4A from bottom up engage with the circular holes 65 and 66. By the tightening of the male screws 67 and 68, the movable upper rail 4A is held between the heads of the male screws 67 and 68 and the flange 61. In such way, the load sensor 60 is fixed to the upper surface of the movable upper rail 4A. On the other hand, as shown in FIGS. 1 and 2, similar to the case of the load sensor 60, the left front load sensor 50 is fixed to the front upper surface of the movable upper rail 4A by engaging the male screws 57 and 58 which penetrates the movable upper rail 4A from bottom up with the circular holes 55 and 56. Here, the tip of the connector 54 is directed backward for the left front load sensor 50, while the tip of the connector 64 is directed forward for the left rear load sensor 60.

As shown in FIG. 2, a load sensor 70 is mounted on the front end of the upper surface of the right movable upper rail 4B, and a load sensor 80 is mounted on the rear end of the upper surface of the right movable upper rail 4B. The load sensors 70 and 80 are provided to detect the load as an electrical signal.

Figure 6:
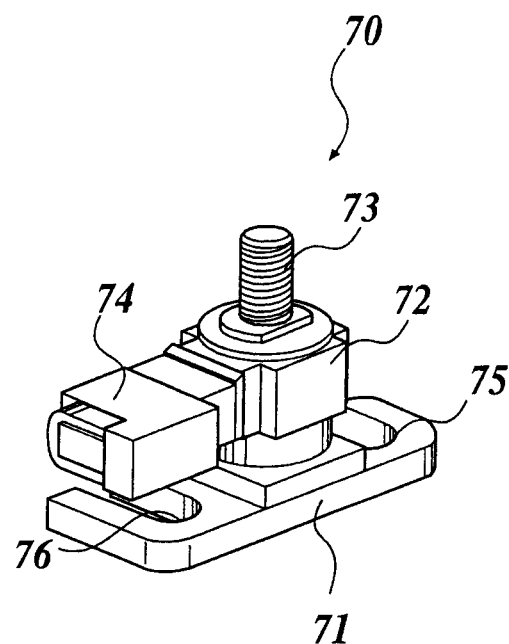
FIG. 6 This is a perspective view showing a right load sensor 70.

The right front load sensor 70 will be described with reference to FIG. 6. FIG. 6 is the perspective view showing the right front load sensor 70. As shown in FIG. 6, the right front load sensor 70 comprises a column-shaped sensing unit 72 which detects the load, a plate-like flange 71 which horizontally extends in the front direction and in the rear direction from the bottom end of the sensing unit 72, a load input rod 73 which extends upward from the upper end of the sensing unit 72, and a connector 74 which extends from the sensing unit 72 to become horizontal with the flange 71. An elongated hole 75 which penetrates the flange 71 in a vertical direction and has a lateral direction as the lengthwise direction is formed on either front part or back part of the flange 71, and a notch 76 which has an opening at the edge along the lengthwise direction of the flange 71 and has a lateral direction as the lengthwise direction is formed on the other part. The notch 76 is formed on the flange 71 directly beneath the connector 74. A screw thread is formed on the periphery of the load input rod 73. Moreover, the sensing unit 72 incorporates a strain gauge, and the load is converted to an electrical signal by the strain gauge.

Figure 7:
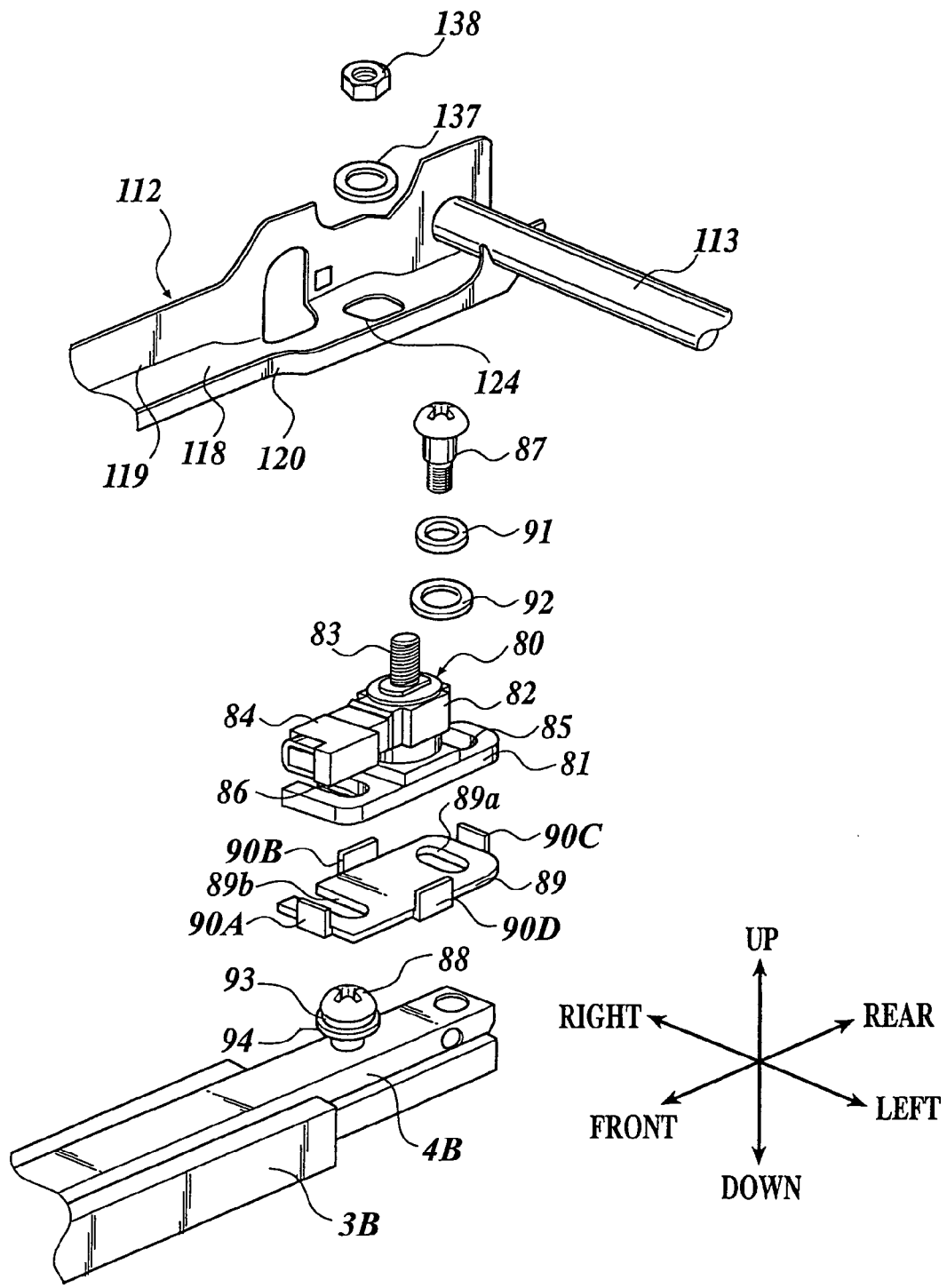
FIG. 7 This is an exploded perspective view showing an attachment structure of a load sensor 80.

FIG. 7 is an exploded perspective view showing a rear end of the movable upper rail 4B. As shown in FIG. 7, similarly to the right front load sensor 70, the right rear load sensor 80 comprises a flange 81, a sensing unit 82, a load input rod 83, and a connector 84. References having the same last single digit are assigned to the corresponding parts of the right front load sensor 70 and the right rear load sensor 80, and the description of each part of the right rear load sensor 80 is omitted.

The right rear load sensor 80 is disposed on the rear end of the right movable upper rail 4B as shown in FIG. 7. A slide plate 89, serving as an example of a second attachment portion and having approximately the same shape as the planar shape of the flange 81, abuts the lower surface of the flange 81, and the flange 81 is grasped by four pawls 90A, 90B, 90C, 90D formed at the edge of the slide plate 89. Pawl 90C may serve as an example of a second projecting wall, and pawl 90D may serve as an example of an inner projecting wall. On the slide plate 89, an elongated hole 89a which penetrates in a vertical direction and has a lateral direction as the lengthwise direction is formed. Further, a notch 89b which has an opening at the edge along the lengthwise direction of the slide plate 89 and has a lateral direction as the lengthwise direction is formed on the slide plate 89. The elongated hole 89a corresponds to the elongated hole 85 of the load sensor 80, and the notch 89b corresponds to the notch 86 of the load sensor 80.

The flange 81 is disposed on the upper surface of the movable upper rail 4B in a state where the slide plate 89 abuts the upper surface of the right movable upper rail 4B. Further, the level screw 87 which is inserted into the ring-shaped damper 91 and the slide member 92 is inserted into the elongated hole 85 from above as a slider, and the level screw 87 is disposed so as to erect it with respect to the upper surface of the movable upper rail 4B by engaging the level screw 87 with the movable upper rail 4B. The slide plate 89, the flange 81, the slide member 92, and the damper 91 are held between the head of the level screw 87 and the movable upper rail 4B, and the level screw 87 can slide in the lengthwise direction of the elongated hole 85.

Further, the level screw 88 which is inserted into the ring-shaped damper 93 and the slide member 94 is engaged with the movable upper rail 4B so as to erect it on the upper surface of the movable upper rail 4, and the level screw 88 is inserted into the notch 86 as the slider. The slide plate 89, the flange 81, the slide member 94, and the damper 93 are held between the head of the level screw 88 and the movable upper rail 4B, and the level screw 88 can slide in the lengthwise direction of the notch 86. In such way, the level screw 87 slides in the lengthwise direction of the elongated hole 85, and the level screw 88 slides in the lengthwise direction of the notch 86. Therefore, the right rear load sensor 80 can slide in a lateral direction with respect to the right movable upper rail 4B in the range between the point where the level screw 87 abuts the right end of the elongated hole 85 and the point where the level screw 87 abuts the left end of the elongated hole 85.

The mounting instruction for the right rear load sensor 80 is as described below. First, the level screw 88 is inserted into the damper 93 and the slide member 94, in this order, and the level screw 88 is engaged with the movable upper rail 4B so as to erect it on the upper surface of the movable upper rail 4B. However, the head of the level screw 88 is to be apart from the upper surface of the movable upper rail 4B Next, the slide plate 89 is fitted to the flange 81 of the right rear load sensor 80, and the flange 81 is grasped by the pawls 90A, 90B, 90C, 90D of the slide plate 89. Then, the level screw 87 is inserted into the damper 91 and the slide member 92, in this order. Further, the level screw 87 is inserted into the elongated hole 85 and the level screw 87 is engaged with the movable upper rail 4B. At this state, the level screw 88 is not in the notch 86. Next, by rotating the right rear load sensor 80 centering the level screw 87, the level screw 88 is inserted into the opening of the notch 86 at the edge of the flange 81 and the level screw 88 is latched by the notch 86. In such way, because the notch 86 is located directly beneath the connector 84, the connector 84 becomes an obstacle and the level screw 88 cannot be inserted into the notch 86 from above to be engaged with the movable upper rail 4B. However, because the level screw 88 is engaged with the movable upper rail 4B beforehand and the notch 86 has an opening at the edge of the flange 81, the level screw 88 can be inserted into the notch 86 by the rotation of the load sensor 80. Moreover, because the flange 81 is held between the head of the level screw 88 and the movable upper rail 4B, the load sensor 80 does not depart upward easily. In addition, because the flange 81 of the load sensor 80 is grasped by the pawls 90A, 90B, 90C, 90D the slide plate 89 does not slide with respect to the flange 81 when the load sensor 80 rotates.

The lower surface of the slide plate 89 is coated by a resin or the like so that the slide plate 89 is easily slid with respect to the movable upper rail 4B. Instead of providing the coated slide plate 89, the flange 81 can be made to be easily slid with respect to the movable upper rail 4B by coating the lower surface of the flange 81 with a resin or the like.

As shown in FIG. 2, the right front load sensor 70 is mounted on the upper surface of the movable upper rail 4B in a similar way as the load sensor 80. The mounting instruction for the right front load sensor 70 is the same as the case of the right rear load sensor 80. That is, the slide plate 79, serving as an example of a first attachment portion and disposed in a same way as the slide plate 89, is grasped by its pawls, the frontmost of which may serve as an example of a first projecting wall, to the lower surface of the flange 71, and the level screw 77 which is inserted into the damper 101 and the slide member 102 comes through the elongated hole 75 from above to be engaged with the movable upper rail 4B so as to erect it on the upper surface of the movable upper rail 4B. The level screw 78 which is inserted into the damper 103 and the slide member 104 engages with the movable upper rail 4B so as to erect it on the upper surface on the movable upper rail 4B, and the level screw 78 is inserted into the notch 76 by the rotation of the right front load sensor 70. Because the level screw 77 can slide in the lengthwise direction of the elongated hole 75 and the level screw 78 can slide in the lengthwise direction of the notch 76, the load sensor 70 can slide in a lateral direction with respect to the right movable upper rail 4B in the range between the point where the level screw 77 abuts the right end of the elongated hole 75 and the point where the level screw 77 abuts the left end of the elongated hole 75. Here, the tip of the connector 74 is directed backward for the right front load sensor 70, while the tip of the connector 84 is directed forward for the right rear load sensor 80.

As shown in FIG. 2, the rectangular frame 110 having a shape of a rectangle frame is mounted and fixed on the four load sensors 50, 60, 70, and 80. The rectangular frame 110 comprises a left patch member 111 which extends in a longitudinal direction, a right patch member 112 which extends in a longitudinal direction to become parallel with the patch member 111, a cross pipe 113 which crosses over between the rear ends of the patch members 111 and 112, and a front member 114 which crosses over between the front ends of the patch members 111 and 112. The front member 114 may serve as an example of a first connecting member, and the cross pipe 113 may serve as an example of a second connecting member.

The patch member 111 is a metal material having a web 115 and left and right flanges 116 and 117, and is U-shaped in section. The length of the web 115 in a longitudinal direction is longer than the length of the flanges 116 and 117 in a longitudinal direction, the front end of the web 115 projects more in front than the front ends of the flanges 116 and 117, and the flanges 116 and 117 are not provided at left and right of the front end of the web 115. The right patch member 112 is also a metal material having the web 118 and left and right flanges 119 and 120, and is U-shaped in section, and the flanges 119 and 120 are not provided at left and right of the front end of the web 118. The mounting hole 121 is formed at the front end of the web 115 of the left patch member 111 to penetrate in a vertical direction, and the mounting hole 122 is formed at the rear end of the web 115 to penetrate in a vertical direction. The mounting hole 123 is formed at the front end of the web 118 of the right patch member 112 to penetrate in a vertical direction, and the mounting hole 124 is formed at the rear end of the web 118 to penetrate in a vertical direction.

The front member 114 is a metal material having the web and front and back flanges, and is U-shaped in section. The left end of the front member 114 is welded to the upper surface of the projected front end of the web 115, and the right end of the front member 114 is welded to the upper surface of the projected front end of the web 118. A harness which is connected to the connectors 54, 64, 74, and 84 of the load sensors 50, 60, 70, and 80 is applied to the front member 114 by clips.

The mounting hole is formed to penetrate in a lateral direction at the rear end of the flange 116 of the left patch member 111, the cross pipe 113 is inserted into this mounting hole, and further, the cross pipe 113 and the flange 116 are fixed by welding. The mounting hole which penetrates in a lateral direction is also formed at the rear end of the flange 119 of the right patch member 112, the cross pipe 113 is inserted in this mounting hole, and the cross pipe 113 and the flange 119 are fixed by welding.

The rectangular frame 110 which is assembled as described above is disposed to the load sensor 50, 60, 70, and 80 as described below. The load input rod 53 of the left front load sensor 50 is inserted into the mounting hole 121 of the left patch member 111 from bottom up, and the front end of the left patch member 111 is mounted on the sensing unit 52. Then, the washer 131 is provided around the load input rod 53 as a ring, the nut 132 engages with the load input rod 53, the washer 131 and the web 115 are held between the nut 132 and the upper surface of the sensing unit 52, and the load input rod 53 is fixed to the front end of the left patch member 111 by the tightening of the nut 132. Similarly, the load input rod 73 is inserted into the mounting hole 123 and the washer 135 from bottom, and the front end of the right patch member 112 is mounted on the sensing unit 72. The load input rod 73 is fixed to the front end of the right patch member 112 by the tightening of the nut 136 which is engaged with the load input rod 73.

Similarly for the rear load sensors 60 and 80, by the tightening of the nuts 134 and 138 which are engaged with the load input rods 63 and 83 that are inserted into the mounting holes 122 and 124 and the washer 133 and 137 from bottom, the load input rods 63 and 83 are fixed to the rear end of the patch members 111 and 112.

Here, because the right load sensors 70 and 80 are disposed to be slidable in a lateral direction with respect to the right movable upper rail 4B, each of the mounting holes 121 to 124 can be fitted to the load input rods 53, 63, 73, and 83, respectively, with minor adjustments of the load sensors 70 and 80 in a lateral direction. Therefore, when the rectangular frame 110 is disposed, the initial deformation of the rectangular frame 110 and the like can be prevented, and the initial load to the load sensor 50, 60, 70, and 80 can be eliminated.

The rectangular frame 110 is assembled by welding in advance before disposing to the load sensor 50, 60, 70, and 80. However, when the rectangular frame 110 is assembled, the patch member 111, the patch member 112, the cross pipe 113, and the front member 114 are fixed by the jig so that each of the mounting holes 121 to 124 can fit to the load input rods 53, 63, 73, and 83, respectively. Therefore, each of the load input rods 53, 63, 73, and 83 can be fit to and inserted into the mounting holes 121 to 124, respectively, without deforming the pre-assembled rectangular frame 110. Thus, the initial load and the initial deformation occurring to the rectangle frame 110; the lower brackets 5A, 5B; the lower rails 3A, 3B; the upper rails 4A, 4B; and the like can be prevented.

In a state where the rectangular frame 110 is disposed on the load sensors 50, 60, 70, and 80, when seen from above as a plan view, the front member 114 is positioned more in front than the submarine pipe 11.

As shown in FIG. 1, the side frame 141 is welded to the flange 116 outside of the patch member 111, and the side frame 142 is welded to the flange 119 outside of the patch member 112. The side frames 141 and 142 are parts of the seat cushion frame, and particularly, constitute the sides of the seat cushion frame. Further, the rectangular frame 110 reinforces the side frames 141 and 142 as a part of the frame of the seat cushion. Before disposing the rectangular frame 110 on the load sensors 50, 60, 70, and 80, the side frames 141 and 142 are disposed to the rectangular frame 110 by welding.

The front of the side frames 141 and 142 are covered with the pan frame 143 from the above, and the pan frame 143 is tightened with respect to the side frames 141 and 142 by the bolts 144A, 144B, 144C, 144D as male screws. Further, the pan frame 143 can be dismounted by loosening and removing the bolts 144A, 144B, 144C, 144D. Here, the pan frame 143 is a part of the seat cushion, and particularly, constitutes the front of the seat cushion frame. The pan frame 143 may be tightened to the side frames 141 and 142 by other male screws instead of the bolts 144A, 144B, 144C, 144D. The pan frame 143 may be fixed to the side frames 141 and 142 by latching the locking unit formed on the pan frame 143 with the locking unit formed on the side frames 141 and 142, and the pan frame 143 may be detached from the side frames 141 and 142 by elastically deforming both of the locking units.

The seat spring 145 is crossed over between the cross pipe 113 and the pan frame 143. A cushion is mounted on the pan frame 143 and the seat spring 145. The cushion, the pan frame 143, and the side frames 141 and 142 are covered with a cover entirely.

In the passenger's weight measurement device 1 configured as described above, when a passenger sits on the seat cushion, the weight (body weight) of the passenger is applied to the load sensors 50, 60, 70, and 80 through the rectangular frame 110, and the weight of the passenger is converted to an electrical signal by the load sensor 50, 60, 70, and 80.

Here, each one of the load sensors 50, 60, 70, and 80 is disposed between the movable upper rails 4A, 4B and the side frames 141 and 142 so as to attach one sensor in the front and one sensor in the rear. The load sensors 50, 60, 70, and 80 are configured to move in a longitudinal direction as a unit with the vehicle seat. Therefore, despite the position of the vehicle seat in a longitudinal direction, the load (weight of a passenger) transmitted to the load sensors 50, 60, 70, and 80 from the vehicle seat can be consistently kept constant. Thus, the accuracy of the passenger's weight measurement can improve.

Further, the right load sensors 70 and 80 can slide in a lateral direction with respect to the movable upper rail 4B. Therefore, even when the load is applied in a lateral direction with respect to the rectangular frame 110 and the like, the load escapes due to the sliding of the load sensors 70 and 80 and the load in a lateral direction is not applied to the load sensors 50, 60, 70, and 80. Thus, the accuracy of the passenger's weight measurement can be improved.

While to the right load sensors 70 and 80 can slide with respect to the right movable upper 4B, the left load sensors 50 and 60 are fixed to the left movable upper rail 4A. Therefore, the entire vehicle seat does not sway in a lateral direction and the minimum rigidity as a vehicle seat is assured.

Moreover, because the submarine pipe 11 is located more in rear than the front member 114, when a frontward inertia force is applied to the passenger due to a front collision or the like of the vehicle, the buttocks of the passenger seated on the vehicle seat are held by the submarine pipe 11. Therefore, so-called submarine phenomenon where the passenger gets under the waist belt can be prevented.

Further, because the submarine pipe 11 is provided separately from the front member 114, the buttocks of the passenger do not hit against the front member 114 at the time of front collision or the like of the vehicle. Therefore, the forward inertia force at the time of front collision or the like of the vehicle is not transmitted to the load sensors 50, 60, 70, and 80 through the rectangular frame 110. Thus, the accuracy of the passenger's weight measurement can be improved even at the time of front collision or the like of the vehicle.

Moreover, because the buttocks of the passenger are held by the submarine pipe 11 at the time of front collision or the like of the vehicle, there is a case where the submarine pipe bends forward in convex. Here, because the right end of the submarine pipe 11 can move in a lateral direction with respect to the bracket 9 and is not fixed to the bracket 9, the load is not transmitted to the load sensors 50, 60, 70, and 80 even when the forward load is applied to the submarine pipe 11. Thus, the accuracy of the passenger's weight measurement can be improved even at the time of front collision or the like of the vehicle.

Further, because the rectangular frame 110 is assembled beforehand, each of the load input rods 53, 63, 73, and 83 can be matched and inserted into the mounting holes 121 to 124, respectively, without deforming the assembled rectangular frame 110. Therefore, application of the initial load to the load sensors 50, 60, 70, and 80 can be prevented when the load is not applied to the rectangular frame 110. Thus, the accuracy of the passenger's weight measurement can be improved.

Further, only the webs 115 and 118 are provided at the front end of the patch members 111 and 112, and the flanges 116, 117, 119, and 120 are not provided there. Therefore, because the patch members 111 and 112 are deformed at the front end of the webs 115 and 118 thereof when a large load is applied to the rectangular frames 110 at the time of front collision or the like of the vehicle, the load is alleviated at the deformed portion. Therefore, a large load is not transmitted to the load sensors 50, 60, 70, and 80 even when a large load is applied to the rectangular frame 110. Thus, the accuracy of the passenger's weight measurement can be improved and the damage to the load sensors 50, 60, 70, and 80 can be suppressed even at the time of front collision or the like of the vehicle.

In addition, because the top of the front load sensors 50 and 70 are opened when the pan frame 143 is dismounted, the maintenance of the load sensors 50 and 70 can be done.

Further, the present invention is not limited to the embodiment described above. Various improvements and design changes can be made without departing from the gist of the invention.

MODIFICATION EXAMPLE 1

In the above described embodiment, the right load sensors 70 and 80 are disposed to be slidable in a lateral direction with respect to the movable upper rail 4B. However, the right load sensor 70 and 80 may further be disposed to be slidable in a lateral direction with respect to the patch member 112. Moreover, the load sensors 70 and 80 may be fixed to the movable upper rail 4B and may be disposed to be slidable in a lateral direction with respect to the patch member 112. Here, in order to dispose the load sensors 70 and 80 to be slidable in a lateral direction with respect to the patch member 112, the mounting holes 123 and 124 are formed as elongated holes lengthened in a lateral direction, the load input rods 73 and 83 are inserted into the ring-shaped slide member, and the slide member is held between the washers 135 and 137 and the web 118. In addition, in order to fix the load sensors 70 and 80 to the movable upper rail 4, the load sensors 70 and 80 are fixed to the movable upper rail 4B in a similar way as the left load sensors 50 and 60.

MODIFICATION EXAMPLE 2

In the above described embodiment, the passenger's weight measurement device 1 is mounted on the right vehicle seat. However, the passenger's weight measurement device 1 may be mounted on the left vehicle seat. The passenger's weight measurement device 1 for the left vehicle seat is structured in symmetrical with respect to the passenger's weight measurement device 1 described in the above embodiment. That is, in the passenger's weight measurement device 1 for the left vehicle seat, the load sensors 70 and 80 which can slide in a lateral direction are on the left side and the fixed load sensors 50 and 60 are on the right side.

Modification Example 3

In the above described embodiment, the flanges 71 and 81 of the load sensors 70 and 80 horizontally extend in a longitudinal direction. However, the flanges 71 and 81 of the load sensor 70 and 80 may horizontally extend in a lateral direction. The lengthwise direction of the elongated holes 75 and 85 and the notches 76 and 86 formed on the flanges 71 and 81 is the lateral direction even when the flanges 71 and 81 extend in a lateral direction. The width of the movable upper rail 4B in a lateral direction can be narrower when the flanges 71 and 81 extend in a longitudinal direction, as described in the above embodiment, as compared with the case where the flanges 71 and 81 extend in a lateral direction.

INDUSTRIAL APPLICABILITY

The passenger's weight measurement device can be applied widely to, for example, car, train, and other vehicle seats.

The invention claimed is:

1. A vehicle seat comprising a passenger's weight measurement device, comprising:
right and left rail members, each of the right and left rail members comprising a fixed rail that is fixable to a vehicle and a movable rail that is disposed to be movable in a lengthwise direction of the fixed rail;
a first load sensor that is mounted to at least one of the right and left rail members;
a second load sensor that is mounted to at least one of the right and left rail members,
a first attachment portion for attaching the first load sensor; and
a second attachment portion for attaching the second load sensor,
wherein the first load sensor is disposed more forwardly than the second load sensor,
wherein a first projecting wall projecting in a vertical direction is formed on a front side of the first attachment portion so as to form the first projecting wall and the first attachment portion as one member, and
wherein a second projecting wall projecting in the vertical direction is formed on a rear side of the second attachment portion so as to form the second projecting wall and the second attachment portion as one member.

2. The vehicle seat as claimed in claim 1, wherein each of the first projecting wall and the second projecting wall comprises a surface that is parallel to a direction perpendicular to a lengthwise direction of the right and left rail members.

3. The vehicle seat as claimed in claim 1, wherein an inner projecting wall, projecting in the vertical direction, is formed on an inside portion of at least one of the first attachment portion and the second attachment portion so as to form the inner projecting wall and the one of the first attachment portion and the second attachment portion as one member.

4. The vehicle seat as claimed in claim 3, wherein a load sensor rod portion, extending in the vertical direction, is provided on at least one of the first load sensor and the second load sensor, and the inner projecting wall crosses a shaft line of the load sensor rod portion and is disposed on a plane that is perpendicular to a lengthwise direction of the right and left rail members.

5. The vehicle seat as claimed in claim 1, wherein an inner projecting wall, projecting in the vertical direction, is formed on an inside portion of the second attachment portion so as to form the inner projecting wall and the second attachment portion as one member.

6. The vehicle seat as claimed in claim 5, wherein a load sensor rod portion extending in the vertical direction is provided on the second load sensor, and the inner projecting wall crosses a shaft line of the load sensor rod portion and is disposed on a plane that is perpendicular to a lengthwise direction of the right and left rail members.

7. The vehicle seat as claimed in claim 6, further comprising:
right and left frame members for supporting an upper portion of the first load sensor and an upper portion of the second load sensor;
a first connecting member for connecting between a front portion of the right frame member and a front portion of the left frame member; and
a second connecting member for connecting between a rear portion of the right frame member and a rear portion of the left frame member,
wherein the first attachment portion supports a lower portion of the first load sensor, and the second attachment portion supports a lower portion of the second load sensor, and
wherein the plane is disposed more forwardly than the second connecting member.

8. The vehicle seat as claimed in claim 6, wherein a third projecting wall projecting upwardly is formed on a position opposite to the first projecting wall across the first load sensor so as to form the third projecting wall and the first attachment portion as one member,
wherein a fourth projecting wall projecting upwardly is formed on a position opposite to the second projecting wall across the second load sensor so as to form the fourth projecting wall and the second attachment portion as one member,
wherein inner projecting walls are provided on an inside portion of each of the first load sensor attachment portion and the second load sensor attachment portion, respectively,
wherein the inner projecting wall on the first load sensor attachment portion is provided between the first projecting wall and the third projecting wall, and
the inner projecting wall on the second load sensor attachment portion is provided between the second projecting wall and the fourth projecting wall.

9. The vehicle seat as claimed in claim 5, further comprising:
right and left frame members for supporting an upper portion of the first load sensor and an upper portion of the second load sensor;
a first connecting member for connecting between a front portion of the right frame member and a front portion of the left frame member; and
a second connecting member for connecting between a rear portion of the right frame member and a rear portion of the left frame member,
wherein the first attachment portion supports a lower portion of the first load sensor, and the second attachment portion supports a lower portion of the second load sensor, and
wherein the inner projecting wall is disposed more frontwardly than the second connecting member.

10. The vehicle seat as claimed in claim 9, wherein the second projecting wall projects upwardly, and an upper end portion of the second projecting wall is provided below the second connecting member.

11. The vehicle seat as claimed in claim 1, wherein the first attachment portion is connected with the second attachment portion by an extending member extending in a longitudinal direction.

12. The vehicle seat as claimed in claim 11, wherein the extending member is attached to an upper portion of the movable rail.

13. The vehicle seat as claimed in claim 1, wherein the first attachment portion is connected with the second attachment portion by an extending member extending in a longitudinal direction, and the extending member is attached to an upper surface of the movable rail by a plurality of fastening members.

14. The vehicle seat as claimed in claim 1, wherein an attachment position of at least one of the first load sensor and the second load sensor is adjustable.

15. A vehicle seat comprising a passenger's weight measurement device, comprising:
   right and left rail members, each of the right and left rail members comprising a fixed rail that is fixable to a vehicle and a movable rail that is disposed to be movable in a lengthwise direction of the fixed rail;
   a first load sensor and a second load sensor that are mounted to at least one of the right and left rail members;
   a first attachment portion for attaching the first load sensor; and
   a second attachment portion for attaching the second load sensor,
   wherein the first attachment portion is provided on an upper front portion of the movable rail,
   wherein the second attachment portion is provided on an upper rear portion of the movable rail,
   wherein a first projecting wall projecting in a vertical direction is formed on a front side of the first attachment portion so as to form the first projecting wall and the first attachment portion as one member, and
   a second projecting wall projecting in the vertical direction is formed on a rear side of the second attachment portion so as to form the second projecting wall and the second attachment portion as one member.

16. The vehicle seat as claimed in claim 15, wherein each of the first projecting wall and the second projecting wall extends in a lateral direction.

17. The vehicle seat as claimed in claim 15, wherein an inner projecting wall, projecting in the vertical direction, is formed on an inside portion of at least one of the first attachment portion and the second attachment portion so as to form the inner projecting wall and the one of the first attachment portion and the second attachment portion as one member.

18. The vehicle seat as claimed in claim 17, wherein a load sensor rod portion, extending in the vertical direction, is provided on at least one of the first load sensor and the second load sensor, and the inner projecting wall crosses a shaft line of the load sensor rod portion and is disposed on a plane that is perpendicular to a lengthwise direction of the right and left rail members.

19. The vehicle seat as claimed in claim 15, wherein an inner projecting wall, projecting in the vertical direction, is formed on an inside portion of the second attachment portion so as to form the inner projecting wall and the second attachment portion as one member.

20. The vehicle seat as claimed in claim 19, wherein a load sensor rod portion extending in the vertical direction is provided on the second load sensor, and the inner projecting wall crosses a shaft line of the load sensor rod portion and is disposed on a plane that is perpendicular to a lengthwise direction of the right and left rail members.

21. The vehicle seat as claimed in claim 20, further comprising:
   right and left frame members for supporting an upper portion of the first load sensor and an upper portion of the second load sensor;
   a first connecting member for connecting between a front portion of the right frame member and a front portion of the left frame member; and
   a second connecting member for connecting between a rear portion of the right frame member and a rear portion of the left frame member,
   wherein the first attachment portion supports a lower portion of the first load sensor, and the second attachment portion supports a lower portion of the second load sensor, and
   wherein the plane is disposed more forwardly than the second connecting member.

22. The vehicle seat as claimed in claim 19, further comprising:
   right and left frame members for supporting an upper portion of the first load sensor and an upper portion of the second load sensor;
   a first connecting member for connecting between a front portion of the right frame member and a front portion of the left frame member; and
   a second connecting member for connecting between a rear portion of the right frame member and a rear portion of the left frame member,
   wherein the first attachment portion supports a lower portion of the first load sensor, and the second attachment portion supports a lower portion of the second load sensor, and
   wherein the inner projecting wall is disposed more frontwardly than the second connecting member.

23. The vehicle seat as claimed in claim 22, wherein the second projecting wall projects upwardly, and an upper end portion of the second projecting wall is provided below the second connecting member.

24. The vehicle seat as claimed in claim 15, wherein the first attachment portion is connected with the second attachment portion by an extending member extending in a longitudinal direction.

25. The vehicle seat as claimed in claim 15, wherein the first attachment portion is connected with the second attachment portion by an extending member extending in a longitudinal direction, and the extending member is attached to an upper surface of the movable rail by a plurality of fastening members.

26. A vehicle seat comprising a passenger's weight measurement device, comprising:
   right and left rail members, each of the right and left rail members comprising a fixed rail that is fixable to a vehicle and a movable rail that is disposed to be movable in a lengthwise direction of the fixed rail;
   a first load sensor that is mounted to at least one of the right and left rail members;
   a second load sensor that is mounted to at least one of the right and left rail members;
   a first attachment portion for attaching the first load sensor; and
   a second attachment portion for attaching the second load sensor,
   wherein the first load sensor is disposed more forwardly than the second load sensor,
   wherein a first projecting wall projecting upwardly is formed on a front side of the first attachment portion so as to form the first projecting wall and the first attachment portion as one member, wherein a second projecting wall projecting upwardly is formed on a rear side of the second attachment portion so as to form the second projecting wall and the second attachment portion as one member, and a third projecting wall projecting upwardly is formed on a position opposite to at least one of the first projecting wall and the second projecting wall across at least one of the first load sensor and the second load sensor so as to form the third projecting wall and at least one of the first attachment portion and the second attachment portion.

27. The vehicle seat as claimed in claim 26, wherein each of the first projecting wall and the third projecting wall projects in a lateral direction.

28. The vehicle seat as claimed in claim 26, wherein an inner projecting wall, projecting in the vertical direction, is formed on an inside portion of at least one of the first attachment portion and the second attachment portion so as to form the inner projecting wall and the one of the first attachment portion and the second attachment portion as one member.

29. The vehicle seat as claimed in claim 28, wherein a load sensor rod portion, extending in the vertical direction, is provided on at least one of the first load sensor and the second load sensor, and the inner projecting wall crosses a shaft line of the load sensor rod portion and is disposed on a plane that is perpendicular to a lengthwise direction of the right and left rail members.

30. The vehicle seat as claimed in claim 26, wherein an inner projecting wall, projecting in the vertical direction, is formed on an inside portion of the second attachment portion so as to form the inner projecting wall and the second attachment portion as one member.

31. The vehicle seat as claimed in claim 30, wherein a load sensor rod portion extending in the vertical direction is provided on the second load sensor, and the inner projecting wall crosses a shaft line of the load sensor rod portion and is disposed on a plane that is perpendicular to a lengthwise direction of the right and left rail members.

32. The vehicle seat as claimed in claim 31, further comprising:

right and left frame members for supporting an upper portion of the first load sensor and an upper portion of the second load sensor;

a first connecting member for connecting between a front portion of the right frame member and a front portion of the left frame member; and a second connecting member for connecting between a rear portion of the right frame member and a rear portion of the left frame member, wherein the first attachment portion supports a lower portion of the first load sensor, and the second attachment portion supports a lower portion of the second load sensor, and wherein the plane is disposed more forwardly than the second connecting member.

33. The vehicle seat as claimed in claim 30, further comprising:

right and left frame members for supporting an upper portion of the first load sensor and an upper portion of the second load sensor;

a first connecting member for connecting between a front portion of the right frame member and a front portion of the left frame member; and a second connecting member for connecting between a rear portion of the right frame member and a rear portion of the left frame member, wherein the first attachment portion supports a lower portion of the first load sensor, and the second attachment portion supports a lower portion of the second load sensor, and wherein the inner projecting wall is disposed more frontwardly than the second connecting member.

34. The vehicle seat as claimed in claim 33, wherein the second projecting wall projects upwardly, and an upper end portion of the second projecting wall is provided below the second connecting member.

35. The vehicle seat as claimed in claim 26, wherein the first attachment portion is connected with the second attachment portion by an extending member extending in a longitudinal direction.

36. The vehicle seat as claimed in claim 26, wherein the first attachment portion is connected with the second attachment portion by an extending member extending in a longitudinal direction, and the extending member is attached to an upper surface of the movable rail by a plurality of fastening members.

* * * * *